April 28, 1936. F. W. STORCK Re. 19,951

APPARATUS FOR DUPLICATING IMPRINTED MATTER

Original Filed July 21, 1930 6 Sheets-Sheet 1

Inventor.
Frederick W. Storck
By Ernest R. Llewellyn
Atty.

April 28, 1936. F. W. STORCK Re. 19,951

APPARATUS FOR DUPLICATING IMPRINTED MATTER

Original Filed July 21, 1930 6 Sheets-Sheet 2

Inventor.
Frederick W. Storck.
by Ernest R. Llewellyn
Atty.

April 28, 1936. F. W. STORCK Re. 19,951

APPARATUS FOR DUPLICATING IMPRINTED MATTER

Original Filed July 21, 1930 6 Sheets-Sheet 3

Inventor.
Frederick W. Storck.
By Ernest R. Llewellyn
Atty.

April 28, 1936. F. W. STORCK Re. 19,951

APPARATUS FOR DUPLICATING IMPRINTED MATTER

Original Filed July 21, 1930 6 Sheets-Sheet 4

Inventor:
Frederick W. Storck.
by Ernest R. Llewellyn.
Atty.

April 28, 1936. F. W. STORCK Re. 19,951

APPARATUS FOR DUPLICATING IMPRINTED MATTER

Original Filed July 21, 1930 6 Sheets-Sheet 5

Inventor.
Frederick W. Storck
by Ernest R. Llewellyn.
Atty.

APPARATUS FOR DUPLICATING IMPRINTED MATTER

Original Filed July 21, 1930 6 Sheets-Sheet 6

Inventor.
Frederick W. Storck.
by Ernest R. Llewellyn
Atty.

Reissued Apr. 28, 1936

Re. 19,951

UNITED STATES PATENT OFFICE 19,951

APPARATUS FOR DUPLICATING IMPRINTED MATTER

Frederick W. Storck, Arlington, Mass., assignor to Standard Mailing Machines Company, Everett, Mass., a corporation of Massachusetts Original No. 1,964,933, dated July 3, 1934, Serial No. 469,501, July 21, 1930. Application for reissue December 10, 1935, Serial No. 53,792

40 Claims. (Cl. 101—132)

This invention relates to improvements in duplicating machines and the process of duplicating and multiplying records, and more particularly in the method by which the record is made on a sheet of paper or the like, in reverse, with suitable dissolvable copying ink and reproduced therefrom as positive copies on duplicate sheets of paper or the like.

In duplicating machines of the character described herein, it is the practice to moisten the clear sheet of paper or the like on which the duplicate copy is imprinted, by either passing said clear sheet through a tank of liquid or by letting the liquid flow to the top of the clear sheet by the primary action of gravity; neither of these methods permits of an effective control over the quantity of liquid deposited on the clear sheet. To produce a duplicate copy uniform in appearance, the quantity of moisture applied to the clear sheet must be uniform and evenly distributed over the surface of same, otherwise the copy will be heavy in some places and light in others.

By my method of moistening the clear sheets, clear legible copies may be made on very thin sheets of material, as it controls and permits the use of a volatile quickly diffusing moistening fluid, in such small quantities that it uniformly dampens the clear sheet to so slight a degree as to be hardly noticeable, yet sufficient to produce a strong clear copy.

The objects of my invention are as follows:

To provide devices for a duplicating machine to automatically control the quantity of moistening fluid deposited on a clear sheet by barometric and capillary action, to thereby produce a larger number of clear legible and well defined copies of the original.

Another object of my invention is to provide means for adjusting the tension of the pressure roll against the cylindrical platen or drum, thus to increase or decrease the pressure by which the clear sheet is pressed against the master sheet, to thereby produce a heavy or light impression on the clear sheet as desired.

A further object of my invention is to construct a duplicating machine so that a large number of clear, well defined light or heavy copies of the original may be made at will on any kind of paper now in use, whether it be thick or thin.

Another object is to so construct and compactly arrange the feeding devices, cylindrical platen or drum and pressure roll to produce efficient and maximum results with a minimum amount of operating fatigue and preferably, so that the printing is done at the top of the platen. By such arrangement, the master copy is secured to the platen by one end, permitting the free end to hang down and be kept straight and flat as it passes up into contact with the clear sheet and under the pressure roll. This arrangement takes care of the expansion of the master copy due to the moisture it takes up from the clear sheets.

Another object of my invention is to provide means for intermittently rotating the cylindrical platen and feeding rolls in unison, and to interrupt their movement at a definite point in their rotation to allow time to feed clear sheets to said feed rolls so they will pass to and be accurately positioned upon the master copy.

A further object of my invention is to provide means whereby a duplicate copy of matter imprinted on a master sheet may be produced on a clear sheet without distorting or puckering either of said sheets.

A further object of my invention is to provide a duplicating or multicopying machine that will make a greater number of copies than could be made heretofore in a given length of time, and will print such copies either light or heavy as desired.

Other objects of my invention will appear from the description and drawings which accompany the same, and which illustrate the preferred form in which I embody my invention. The statement of the objects of my invention is intended to generally explain the same and not to limit it in any manner.

In the drawings accompanying this specification and forming a part thereof:

Fig. 6 is a section of one end of the printing roll, and shows the end of the segment for clamping the sheet having the printed reverse copy of record to be reproduced. It shows one of the spring members which hold the segment in its recess and the cam member for moving said segment sidewise to clamp and unclamp the reverse master copy.

Fig. 7 is a side sectional elevation of the intermittent gears which operate to intermittently rotate the printing platen.

Fig. 10 is a side elevation partly in section of the gravity feed reservoir for supplying the moistening fluid to the feeding tank.

Fig. 11 is a plan view of the spring clamps for holding the gravity feed reservoir in its vertically adjusted position.

Figure 1:
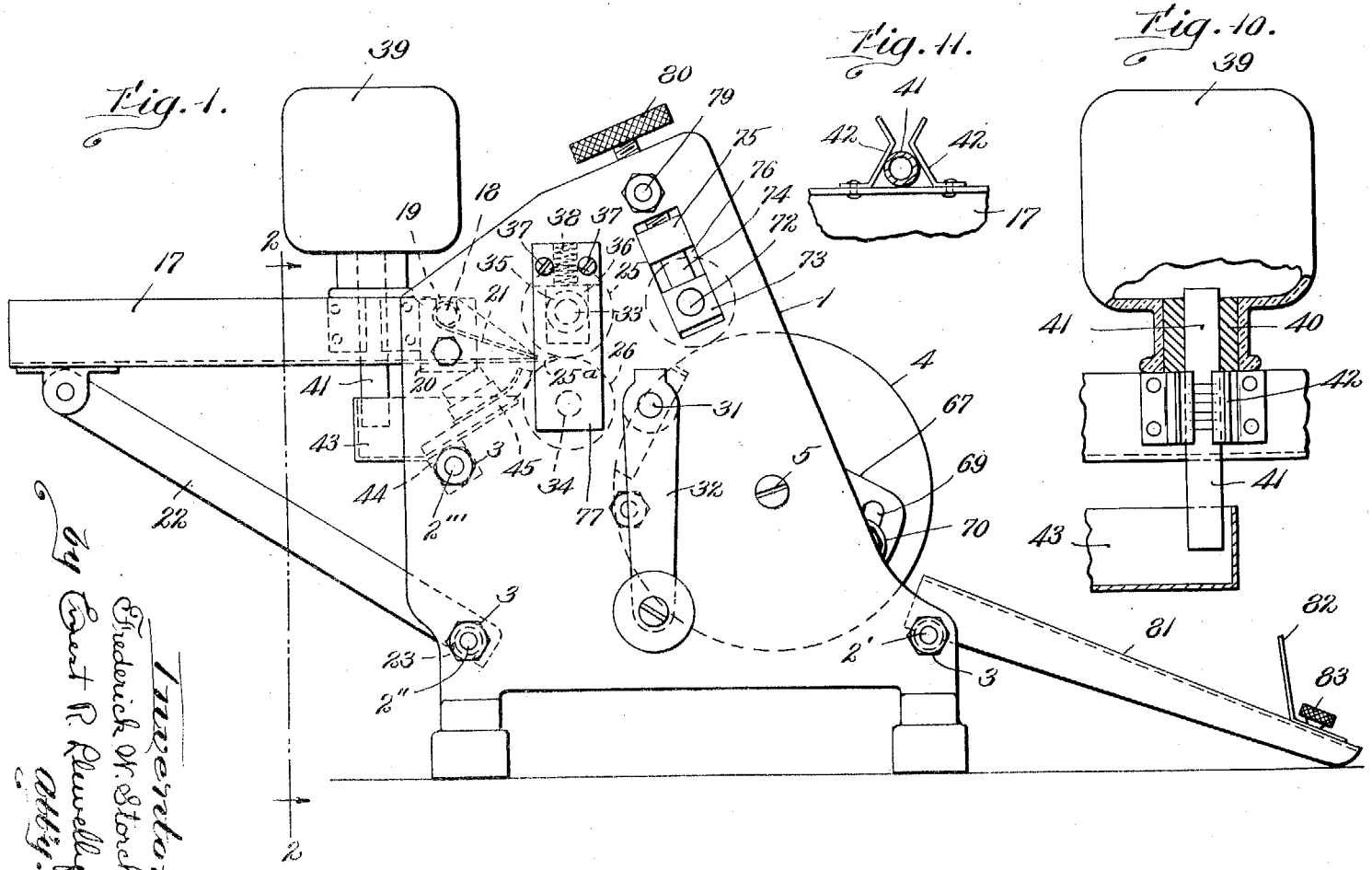
Fig. 1 is an end elevation of my improved duplicating and multicopying machine, and shows the general arrangement of the various parts.

In the drawings 1, 1 are the end members of the stationary frame in which are mounted the operating elements of the duplicator. The frames 1, 1 are held in position by the rods 2′, 2″, 2‴, and the nuts 3, 3, 3, threaded upon them.

The printing platen or drum 4 is rotatably mounted upon the shaft 5, which in turn is secured against rotation in the frames 1, 1, the shaft 5 being held against rotation by the bushing 6, shoulder 7 and nut 8, which is threaded on the end of said shaft 5.

The printing platen 4 is provided with a clamping device for holding the reverse master copy of the record, its upper end 9 being clamped between the radial wall 10 and the edge of the segment 11. The segment 11 is held against the wall 10 and paper, by the tension of the spring 12, 12, 12, and is held in the recess 13 by the tension of the spring 14, 14.

The cams 15, 15, bear upon the pins 16, 16, secured in the segment 11, rotation of the shaft 15′ causes the high part of the cams 15, 15 to contact with the pins 16, 16 and move the edge of the segment away from the radial wall 10 and free end 9 of the reverse sheet.

I provide a support 17 for the duplicate sheets of paper; it is supported by a rod 18, which passes through holes in its inner end, the rod 18 is supported at each end in upwardly projecting slots 19, 19, in the members 20, 20, which are secured to the side frames 1. A member 21 is rotatively hinged at one edge to the rod 18, so that its outer free edge will lie upon the bottom of the support 17. The duplicate sheet of paper is passed under the free edge of the member 21 as it is fed to the feeding rolls, the friction of the edge of the member 21 on the sheet of paper serves to smooth it and hold it flat and present its edge evenly to the feeding rolls. A brace 22 is pivoted to the outer end of the support 17, at one of its ends, its other being provided with a slot 23, to removably engage the rod 2″.

It will be understood that the sheet of material on which the reverse master copy is made may be of any desired size, the margins at the edges of the sheet may be varied at will and the record in writing, printing or drawing may occupy as much or little of the surface of said sheet as desired, also the record may be made on the master reverse copy in any desired position and impressed on a duplicate sheet of material in a corresponding position.

Means are provided for feeding the clear sheet of material to the printing platen 4, and accurately position it to make the desired contact with the master reverse copy of the record to be duplicated, and in this instance comprise the guiding edges 24, 24, of the support 17, contact with which aligns the forward edge of the clear sheet parallel with the axis of the feeding roll 25, and the combined feeding and moistening roll 26. The clear sheet is then advanced, in this instance manually, and the forward edge of the sheet positioned by and between the feeding rolls 25, 26, or, as more clearly expressed—the sheet is positioned in and against the bight 25*a* formed by the feeding rolls 25, 26. This advancing of the clear sheet and engaging the forward edge of the sheet in the bight 25*a* takes place while the feed rolls are not rotating. The roll 26 is non-porous and rotated in the directions indicated by the arrows, by and in unison with the printing roll 4, as will be more fully described. The bight 25*a* of the feed rolls is preferably positioned close to and below the bight of the printing platen 4 and its coacting pressure roller 71 so that the forward advancing edge of the clear sheet will first engage with the platen face and be carried upward thereby.

The feed roll 25 is provided with the shaft 33, which extends beyond each end to form journals designed to rotate in the bearings 35, 35; said bearings 35, 35 are slidably mounted in the rectangular bearing blocks 36, 36. The bearing blocks 36, 36 are secured to the inside of the side frames 1, 1 by screws 37, 37; springs 38, 38 acting on the bearing blocks 36, 36, serve to maintain the feed roll 25 in contact with the roll 26, with a predetermined pressure.

In this instance the roll 26 is utilized as an intermediate moisture applicator and which is supplied with a suitable moistening fluid in a manner hereinafter described. I preferably use an applicator having characteristics for diffusing the liquid supplied thereto and have found that, for practical and efficient results, the surface attraction and tension of the applicator may be used to further a uniform distribution and apply the moisture to the face of a clear sheet as the sheet is advanced in engagement with the applicator. The moistening fluid must be such as will dissolve the ink on the reverse master sheet. I preferably use a fluid dissolvent that will dry rapidly and diffuse quickly and evenly over the surface of the clear sheet. My reason for using a rapidly drying moistening fluid is that I have discovered such fluid will not distort the material of the duplicate sheet of paper, or the like, and cause it to wrinkle and curl.

I have found that more and better duplicate copies can be made from the master reverse copy in a given length of time from a rapidly diffusing and drying fluid, and by controlling the amount of fluid deposited on each duplicate sheet.

The means for feeding the moistening fluid consists in an inverted reservoir 39, to hold the desired quantity of the moistening fluid having a stopper 40, and a tube 41 inserted in an opening in the stopper. Spring clamps 42, 42 are secured to the side of the support 17. Said clamps 42, 42 are adapted to receive the tube 41, and frictionally hold it so that it may be adjustable up and down vertically. The end of the tube 41 is arranged to extend downwardly into an open tank 43, and adjusted up and down to raise or lower the level of the fluid in said tank 43.

The reservoir 39, being inverted, the fluid therein will be held from flowing out by the action of vacuum while the end of the tube is covered by fluid in the tank 43. When the level of the fluid in the tank 43 is lowered by use, and the end of the tube 41 uncovered, additional fluid will flow down to replenish what is used.

The tank 43 is secured to the hollow tube 44, which in turn is mounted on one of the stay rods 2'''. Liquid is fed from the tank 43 to the moistening roll 26, by means of capillary action of the fibrous material 45, which is secured to the forward slanting edge of the tank 43, by the flexible plate 46, and screws 47. The lower edge of the fibrous material 45 is immersed in the fluid, its upper edge being supported so as to exert pressure in contacting with the roll 26, so that fluid conveyed upwardly by the fibrous material will be deposited on the roll 26, and further diffused by the surface attraction and tension of the roll face, and surplus moisture wiped by the fibrous material as the roll is rotated and thereby the limited moisture remaining on the roll is uniformly spread upon the duplicate sheet of paper as it is fed to the printing platen 4, by rotation of the rolls 25, and 26.

It is to be noted that the wick alone is relied upon to supply moisture to the damping roller in the preferred form of my invention shown in Figs. 1, 2, 3, 5 and 6, and in such form I prefer to use a closely compacted, degreased, wool felt which feeds the liquid slowly and spreads it very evenly upon the face of the damping roller, and wherever in the following claims I use the term "sole wick means" for supplying moisture, I hereby intend to exclude any means such as immersion of the damping roller in the liquid as added means for applying moisture to the damping roller in conjunction with the wick means.

Figure 2:
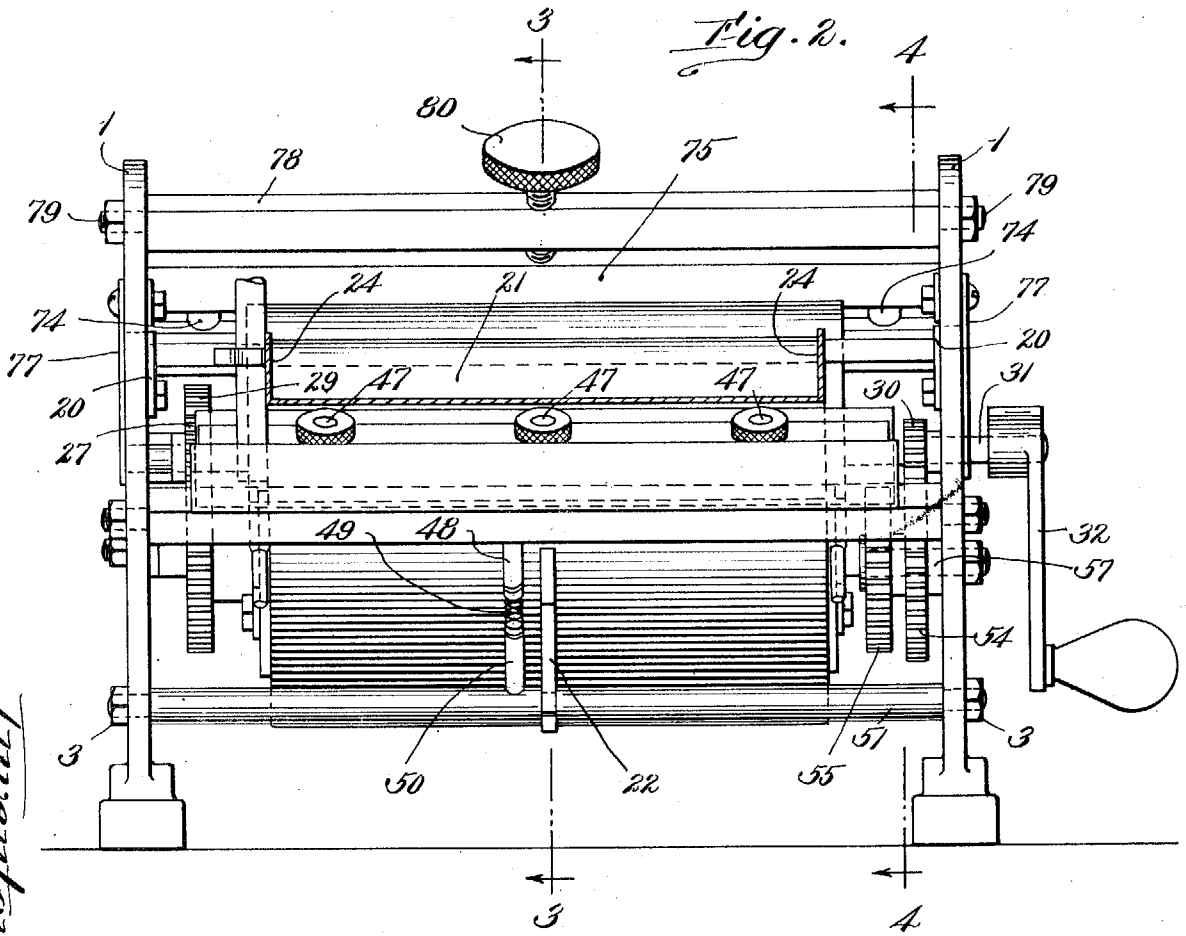
Fig. 2 is a side front elevation taken from the left of Fig. 1, on line 2—2.
Figure 3:
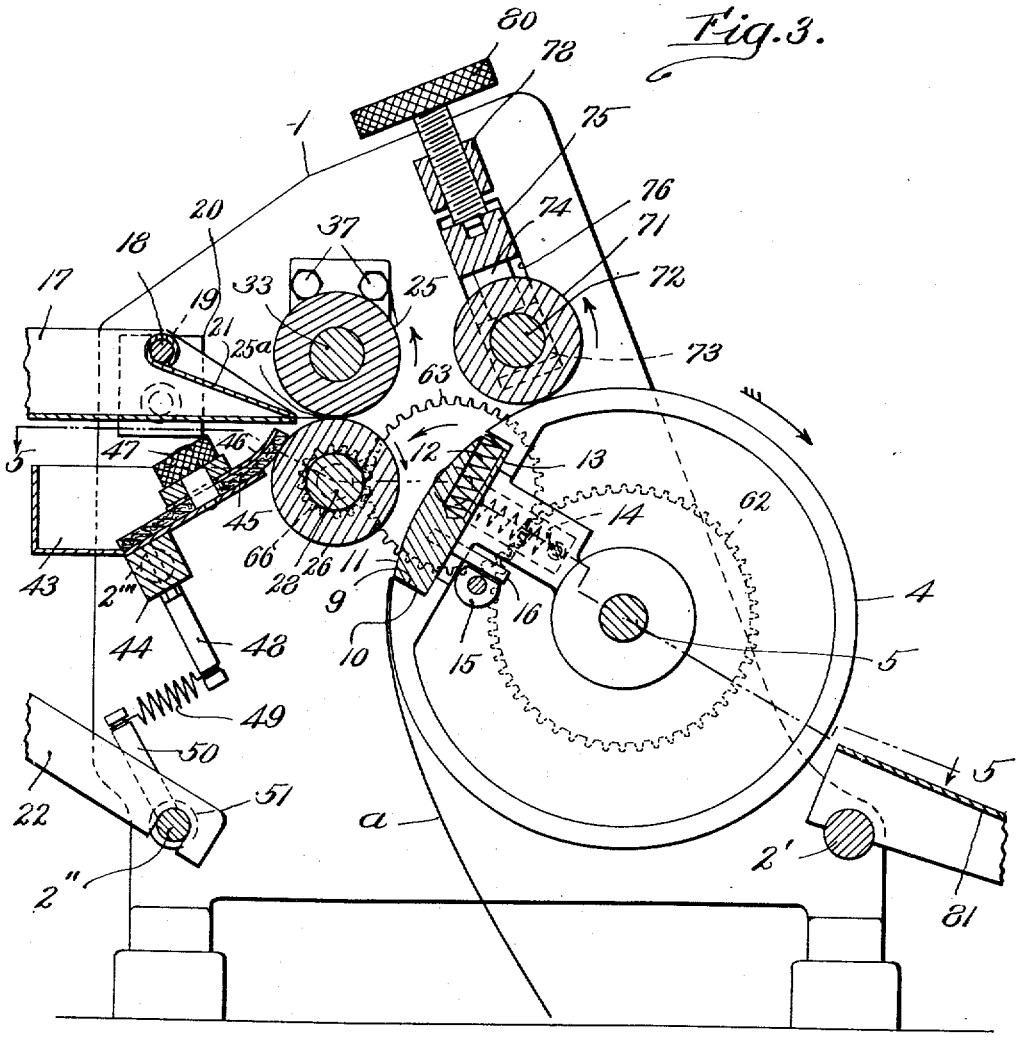
Fig. 3 is a sectional elevation taken on line 3—3, Fig. 2.
Figure 4:
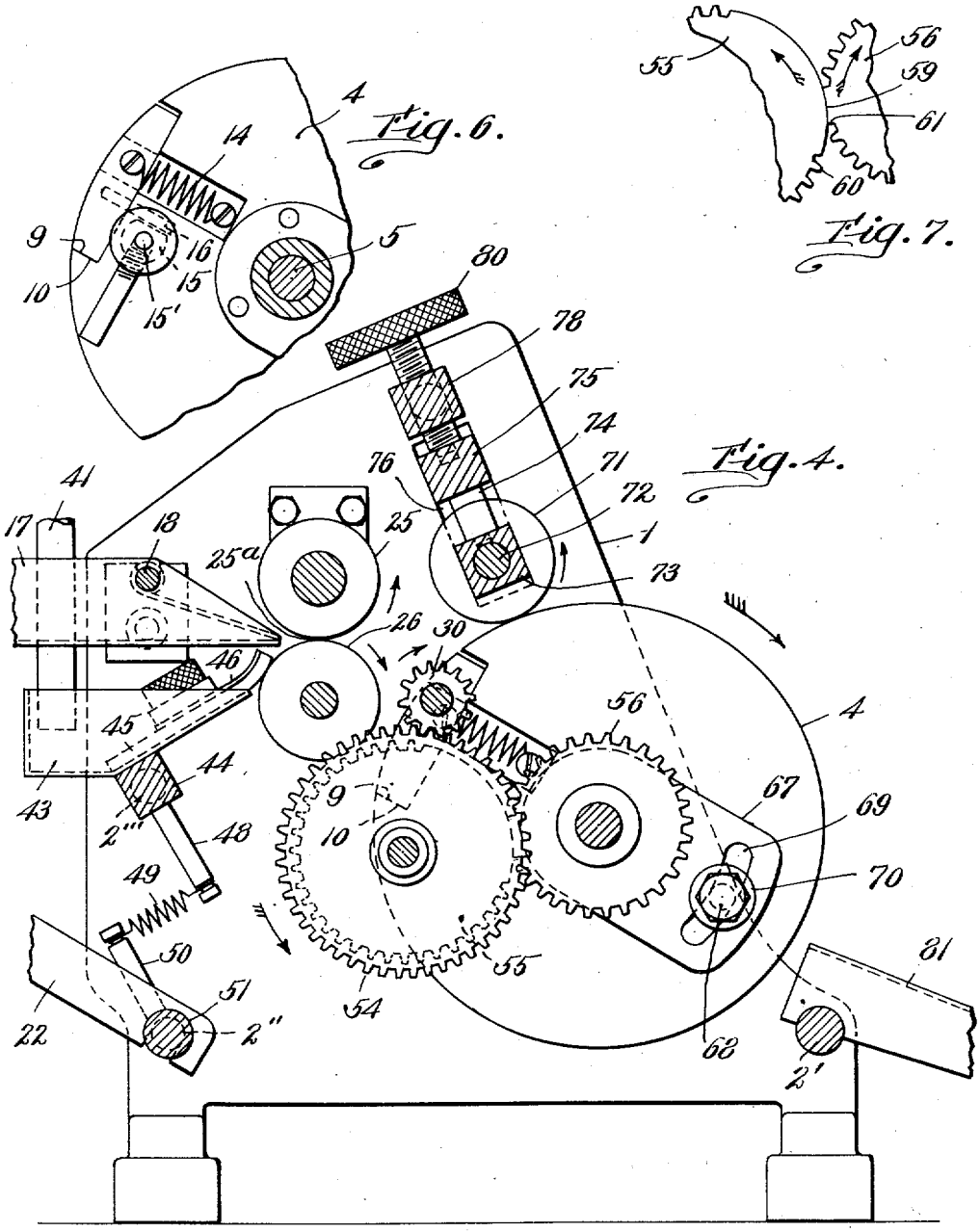
Fig. 4 is a sectional elevation taken on line 4—4, Fig. 2.
Figure 5:
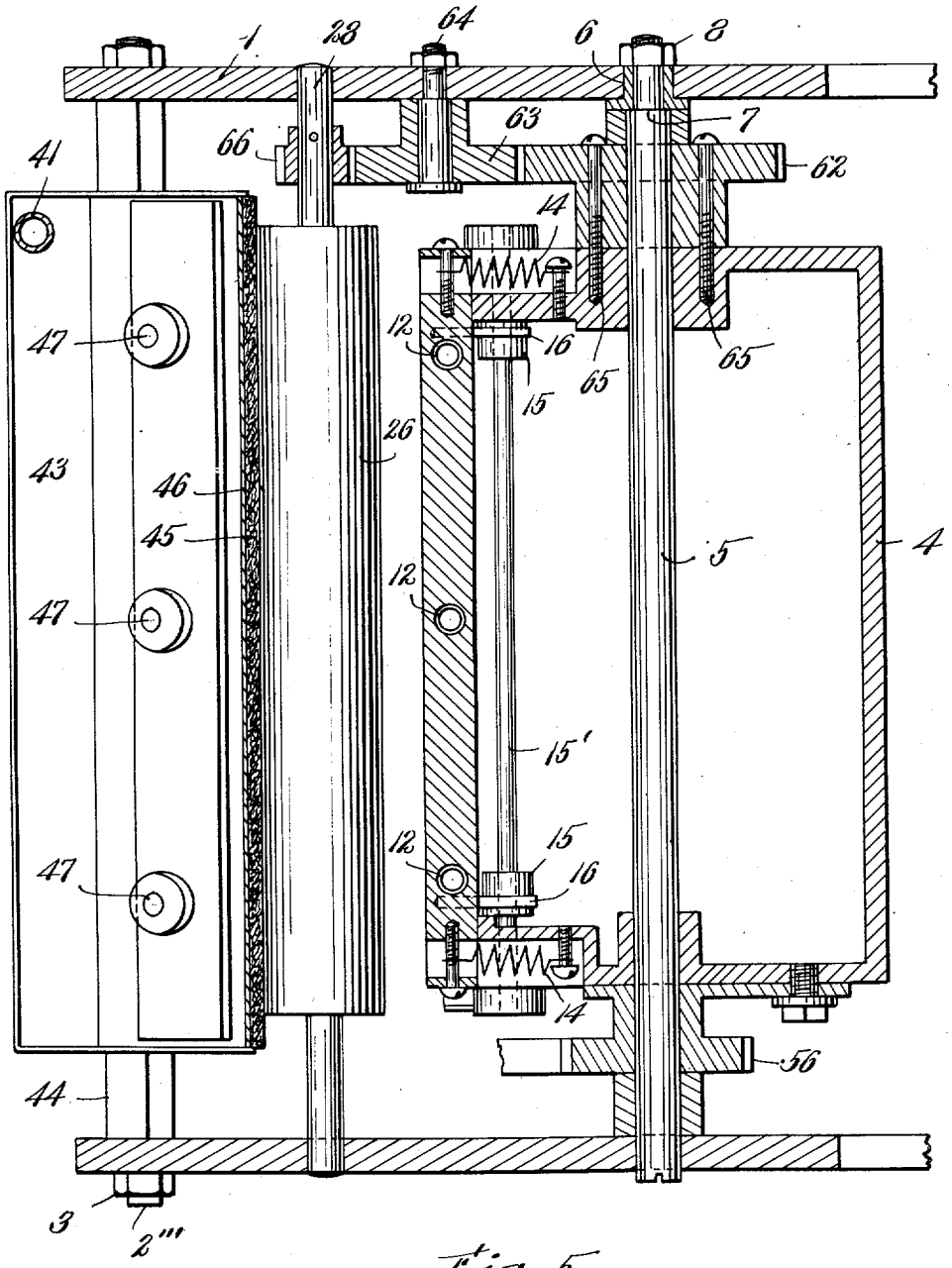
Fig. 5 is a sectional top view taken on line 5—5, Fig. 3.

The hollow tube 44 is free to rotate on the stay rod 2''', for the purpose of holding the fibrous material 45 aligned in proper contact with the surface of the roll 26, and with a predetermined pressure. The pressure is obtained by means of the stud 48, spring 49, stud 50 and hollow tube 51, mounted on the stay rod 2'''. As shown in Fig. 2, the hollow tube 51 extends between the side frames 1, 1, and is held by friction against rotation by tightening the nut 3. To increase the tension of the spring 49, the nut 3 is loosened and the hollow tube 51 rotated outwardly, thereby lengthening the spring 49 and increasing its tension, and the pressure of the fibrous material against the moistening roll, a reverse movement of the tube 51, decreases the tension.

In practice I have found it preferable to employ a capillary fibrous material as the agent in direct engagement with the applicator roll 26 and from which solely the roll 26 receives its moisture. This enables me to control the amount of moisture deposited on the applicator and transferred to the clear sheet, the amount of ink dissolved from the reverse master copy, and impressed on the clear sheet during each cycle of operation. By these means I am able to make a clearer, sharper reproduction, a greater number of copies and a heavy or light impression as desired.

Figure 8:
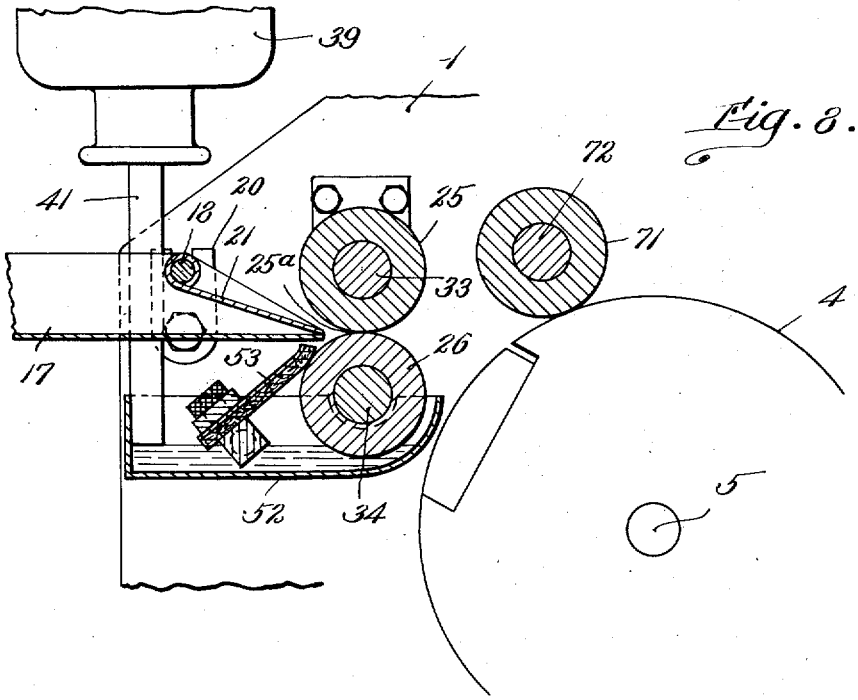
Fig. 8 is a diagrammatic sectional elevation of a modified form of moistening device, showing a section of the printing platen, the pressure roll for printing, the feeding and moistening rolls, liquid tank, gravity feed reservoir and fibrous material for conveying and controlling the moisture imparted to a duplicate sheet of paper.
Figure 9:
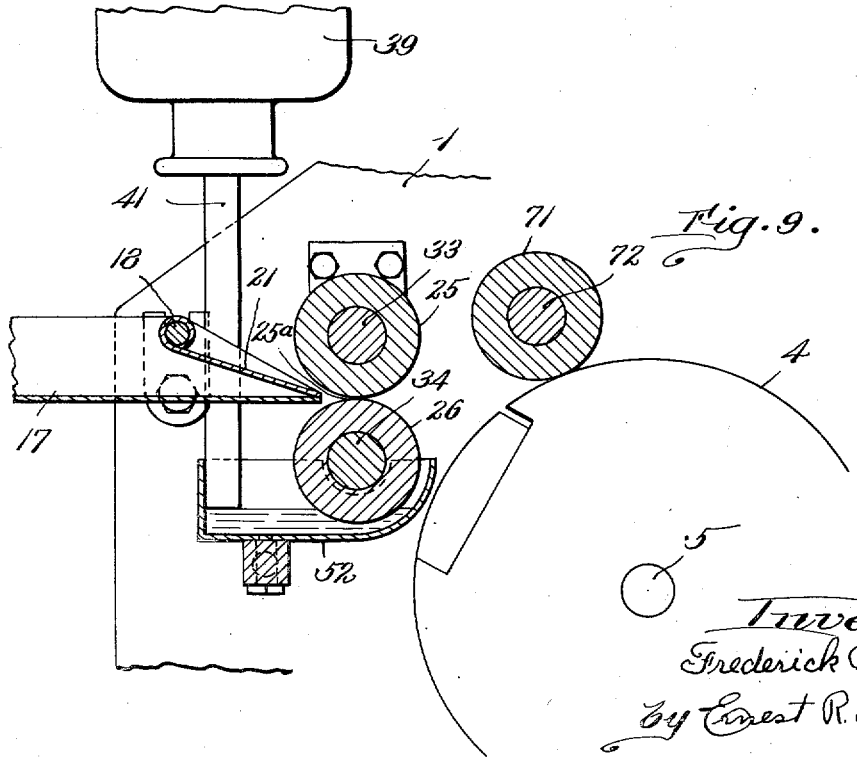
Fig. 9 is a diagrammatic sectional end view of another modified form of moistening device.

In Figs. 8 and 9 are shown two modified methods of supplying moistening fluid to the clear sheet. In Fig. 8 a portion of the roll 26 is immersed in the fluid contained in the tank 52, the liquid being distributed and the surplus removed by the fibrous material 53.

Fig. 9 is the same in construction as Fig. 8, except that the fibrous material is omitted.

The mechanism for intermittently rotating the printing platen 4 consists of the pinion 30, mounted on the stud 31, and the crank 32, for rotating it continuously or otherwise as desired; an intermediate gear 54, to which the intermittent gear 55 is secured, this gear 55 meshes with the other intermittent gear 56. The gears 54 and 55 are rotatably mounted on a stud 57, which is secured to one of the frames 1. The intermittent gears 55 and 56 are of the usual construction, wherein a predetermined portion of the periphery of each is free from teeth and continued rotation of the driving gear will not rotate the driven gear until the blank space in the driving gear has passed the blank space in the driven gear and the teeth in both enmesh. Fig. 7 illustrates the construction of the gears 55 and 56.

In operation the gears 55 and 56 rotate in the direction of the arrow, when in their rotation the blank space 58 reaches the space 59, the space 58 will slide on the concave blank space 59 without imparting any rotative movement to the gear 56, until the gear tooth 60 contacts with the wall 61, of the blank space 59, thereupon the teeth of both gears enmesh and the gear 56 and printing platen 4 will be rotated.

With the above drive mechanism the pinion 30 may be rotated continuously while the intermittent gears automatically effect a dwell of the printing platen and feed rolls 25, 26 at a determinate point after each complete cycle of rotation of said printing platen and thus permits the positioning of the next clear sheet as aforementioned.

The feed rolls 25 and 26 are intermittently rotated from the printing platen 4 by means of the gear 62, which is rotatably mounted on the fixed shaft 5, and secured to the end of the printing platen 4, by screws 65, 65. The gear 62 enmeshes with and drives the intermediate gear 63, which is rotatably mounted on the stud 64.

The intermediate gear 63 meshes with and drives the pinion 66, which is secured by pins, or otherwise, to the shaft 28, of the moistening and feeding roll 26. The gears 62 and 63, and the pinion 66 are so proportioned that the peripheral surfaces of the printing platen 4 and the feeding roll 26 rotate at substantially the same speed and their rotative movements are synchronized in stopping and starting.

It will be noted that the gear 56 is rotatively mounted on the shaft 5, and is adjustably secured to the end of the printing platen 4, by means of the extension 67, formed upon it and the bolt 68, which passes through the circular slot 69. The bolt 68 is threaded into the end wall of the printing platen 4 and is provided with the washer 70. The purpose of this method of attaching the gear 56 to the platen 4 is to provide means for adjusting the position of the clamping wall 10, with relation to the point of contact of the pressure roll 71, with the printing platen 4.

To locate the impression of the reverse master copy of the record on the duplicate sheet in the desired position, clamp the reverse master copy of the record to the printing platen 4 and adjust the intermittent gear 56 until the duplicate sheet contacts with the reverse master copy of the record at the desired location.

The pressure roll 71 is preferably made of yieldable material such as rubber. It is formed upon the shaft 72, which is journalled at its ends in the bearings 73, 73. The bearings 73, 73 are secured to studs 74, 74, which in turn are secured to the cross-bar 75. Elongated slots 76, 76 are formed in the two side frames 1, 1 of a size to receive the bearings 73, 73 and the ends of the cross-bar 75, and permit them to slide freely therein. A cross-bar 78 is secured at its ends to the frames 1, 1, by nuts on the threaded portions 79. The cross-bar 78 is located above and in line with the cross-bar 75; its purpose is to receive the threaded adjusting screw 80. The lower end of the adjusting screw 80 contacts with the cross-bar 75 by adjusting the screw up or down in the threaded hole in the cross-bar 78, the pressure of the pressure roll 71 on the printing platen 4 is varied as desired.

A shelf 81 is provided, one end of which is removably positioned on the rods 2', its free end being supported on a table, which supports the duplicator when being operated. The shelf 81 may be provided with a stop 82 which is secured to the shelf by the screw 83. The shelf 81 is positioned so that the duplicate sheets will fall upon it as they pass from the pressure roll 71.

The operation of my improved duplicating or multicopying machine is as follows:

Assuming the required number of clear sheets for producing the duplicate copies desired have been placed upon the support 17, and the record to be duplicated made in reverse on a master sheet in the desired position. The first step is to secure one edge of the master sheet between the clamping members 9 and 12.

In the operation of duplicating, the clear sheet to be duplicated upon is moved under the forward edge of the member 21, until it evenly contacts in the bight of the feed rolls 25 and 26. Rotation of said rolls advances the sheet to register with and engage in the bight formed by the pressure roller 71 and the printing platen 4. As the clear sheet to be duplicated upon is positioned to engage between the pressure roller and platen 4, these elements act to advance or feed the sheet in registered engagement with the reverse master copy. As the sheet is advanced by the feed rolls or the pressure roller and platen, the clear sheet will receive moisture from the applicator, which, in this instance, is the roller 26.

It is obvious that by utilizing the pressure roller 71 and platen 4 to finallly move the clear sheet into engagement and registration with the master copy, it is not essential to synchronize the peripheral speed of the feed rolls 25 and 26 with respect to the peripheral speed of the platen 4, to a micrometer relationship.

As the clear moistened face of the sheet meets the master copy and passes with it under the pressure roller 71, they are thus brought into contact with one another to produce a reverse printed duplicate of the master record. The duplicate printed sheet as it passes from under the pressure roller 71, falls upon the shelf 81.

It will be seen that through the action of the intermittent gears, the rotation of the printing platen 4 will be automatically stopped when the wall 10 of the clamping means has reached a predetermined distance from the point of contact of the pressure roll 71. This characteristic of the operating mechanism and the effected automatic dwell period enables the operator to readily synchronize the movement of feeding the duplicate sheet with respect to said dwell period so that the record on the master reverse copy may be accurately located on such duplicate sheet, or so that it may be made to register accurately with any matter previously impressed on said sheet to be duplicated upon.

In the drawings and description accompanying the same I have shown and described the best form that now occurs to me in which to embody my invention. I do not, however, wish to be limited to the form shown, as it is apparent that modifications may be made in the form and arrangement of the parts without departing from the spirit of my invention.

Having described my invention, what I claim is:

1. In a machine for duplicating on a clear sheet matter imprinted in reverse with copying ink on a master sheet, a tank containing a solvent liquid, means for conveying a constant quantity of said liquid to the under face of the clear sheet by capillary action, means for positioning and feeding successive clear sheets to contact and register with the imprinted face on the master sheet and means to press the clear sheet against the master sheet to print thereon a duplicate of the matter imprinted on the master sheet.

2. In a machine, means for duplicating on a clear sheet, matter imprinted in reverse with dissolvable copying ink on a master sheet, means for moistening the under face of said clear sheet comprising a tank, a solvent liquid in said tank, a strip of fibrous material having one edge immersed in said liquid solvent, its other edge resting upon the periphery of a moistening roll, said moistening roll, means for feeding and positioning the moistened face of the clear sheet against the imprinted face of the master sheet to print a duplicate of the matter on the master sheet upon the clear sheet and means for holding said master sheet.

3. In a machine for duplicating on a clear sheet matter imprinted in reverse with copying ink on a master sheet, a frame, a revolvable platen, means for securing the master copy to said platen, a pressure roll in contact with said platen, combined feeding and moistening rolls, means for conveying a moistening fluid to one of said rolls, means for intermittently rotating said platen and feeding rolls in unison and to interrupt their movement while a clear sheet is positioned by and between the feeding rolls to be fed to and register with the master copy, to print a duplicate of the matter on the master copy at a predetermined position on the clear sheet.

4. In a machine for printing on a clear sheet a duplicate of the matter imprinted in reverse in copying ink on a master sheet, means for moistening the under face of a clear sheet comprising a tank having a quick diffusing and rapid drying fluid solvent therein, combined feeding and moistening rolls and means for conveying by capillary action the fluid solvent from the tank to one of said combined feeding and moistening rolls and means for rotating said feeding rolls to distribute the fluid solvent on the under face of the clear sheet as it passes through said rolls.

5. In a machine for printing on a clear sheet a duplicate of the matter imprinted in reverse with copying ink on a master sheet, means for moistening a clear sheet, comprising an inverted reservoir closed at the top for containing a moistening fluid, means to convey the liquid from the bottom of said reservoir into a tank, and maintain it at a predetermined level therein, said tank, a pair of revolvable feeding rolls, means for conveying the fluid in the tank to one of said feeding rolls by capillary action and means for revolving said feeding rolls to feed and moisten the clear sheet as it passes through the feeding rolls.

6. In a machine for producing on a clear sheet duplicate copies of matter imprinted in reverse on a master sheet with copying ink, means for moistening and feeding the clear sheet comprising a reservoir, a tank, combined feeding and moistening rolls, means for revolving said rolls and means whereby a liquid solvent is conveyed from the reservoir to one of said feeding rolls by barometric and capillary action and deposited on the under face of a sheet of copy paper as it passes through the rolls.

7. In a machine for producing duplicate copies of matter imprinted in reverse on a master sheet with copying ink, a stationary frame, a printing platen rotatably mounted in said stationary frame, an intermittent gear adjustably secured to said printing platen to intermittently rotate it, combined feeding and moistening rolls mounted in said stationary frame, means to convey moistening fluid to one of said rolls, means for rotating said feeding and moistening rolls in unison with said printing platen to feed a clear sheet to contact with a master sheet secured to said printing platen and means to press said clear sheet against the master sheet.

8. In a machine for producing duplicate copies of matter printed in reverse on a master sheet, a frame, a printing platen revolvably mounted in said frame, means for securing said master sheet to said printing platen, means for intermittently rotating said printing platen, a pair of feed rolls for feeding a clear sheet of paper, means for applying a limited film of volatile moistening fluid to the face of one of said feed rolls to be deposited on a clear sheet of paper as it passes between said pair of feed rolls, means for revolving said feed rolls in unison with the rotative movement of the printing platen and a pressure roll for pressing the clear sheet against the master copy.

9. In a machine for producing duplicate copies of matter imprinted in reverse on a master sheet with copying ink, a stationary frame, a shaft mounted in said frame, an intermittent gear mounted on said shaft, a printing platen mounted on said shaft and adjustably secured to said intermittent gear, means for securing the master copy to said printing platen, means for feeding and moistening a clear sheet, means for rotating said feeding and moistening means in unison with the printing platen, means for conveying moistening fluid to said moistening and feeding means, and means for pressing the clear sheet against the imprinted face of the master sheet.

10. In a machine for duplicating on a copy sheet matter imprinted in reverse on a master copy with copying ink, a device for moistening a copy sheet, comprising a tank, means including a fibrous material mounted in said tank to convey moistening fluid from said tank to the under face of a copy sheet by capillary action and means to automatically maintain a predetermined quantity of moistening fluid in said tank.

11. In a machine for duplicating on a copy sheet matter imprinted in reverse on a master sheet with copying ink, means for supporting a copy sheet and guiding same in a flat condition to feeding rolls, said feeding rolls, a device for moistening a copy sheet comprising a fibrous material, means to supply said fibrous material with a moistening fluid by capillary action from a tank, said tank, and means to convey said moistening fluid from the fibrous material to the under face of a copy sheet.

12. In a machine for duplicating on a clear sheet matter imprinted in reverse on a master sheet in copying ink, a stationary frame, a printing platen revolvably mounted in said stationary frame, means to secure a master sheet to said printing platen, combined feeding and moistening rolls, means for conveying moisture to the under side of the clear sheet of paper only when the said combined feeding and moistening rolls are rotated.

13. In the art of printing duplicate copies of matter imprinted on master sheets with dissolvable ink by steps which consist of moistening the underside of a clear sheet by capillary action with a quickly diffusing and drying liquid ink dissolvent and of feeding the damp clear sheets into contact with the master imprinted sheet under pressure.

14. The method of multiplying copies comprising forming a master copy sheet with ink characters in reverse, providing limited moisture by capillary attraction, uniformly subjecting one face of a sheet to such limited moisture, disposing the moistened face of said sheet and master copy in position for contact with each other and subjecting such sheets to pressure.

15. The method of multiplying copies comprising forming a master copy sheet with ink characters in reverse, uniformly subjecting the under face of a sheet to be printed to limited moisture, disposing said sheets in engaging relation and subjecting such sheets to pressure.

16. The method of multiplying copies comprising forming a master copy sheet with ink characters in reverse, uniformly subjecting the under face of a sheet to be printed to moisture by capillary attraction in the presence of pressure, disposing said moistened sheet over said copy and subjecting both to pressure.

17. That step in the method of multiplying copies from a master copy having ink characters in reverse which consists in elevating moisture by capillary attraction for application to a sheet, producing a uniform film from such moisture and transferring moisture from such film to the lower face of a sheet to be printed.

18. That step in the method of multiplying copies from a reverse character master copy which consists in elevating moisture by capillary attraction for application to a sheet and producing a uniform film from such moisture upon a non-yielding roller, transferring moisture from such film to the face of a sheet to be printed and simultaneously subjecting said sheet to pressure.

19. In a copy-multiplying device for duplicating on a clear sheet matter imprinted in reverse on a master sheet with copying ink, in combination, a master copy drum, a compression roller and a damping roller and wick means for moistening said damping roller.

20. In a copy-multiplying device for duplicating on a clear sheet matter imprinted in reverse on a master sheet with copying ink in combination, a master copy drum, a compression roller and a damping roller and sole wick means engaging the face of said damping roller for moistening said damping roller.

21. In a copy-multiplying device for duplicating on a clear sheet matter imprinted in reverse on a master sheet with copying ink having a master copy drum, in combination with opposed feed rollers for advancing a sheet to be printed, one of said rollers being journalled under tension, moisture supplying means including a wick, one of said rollers engaging said wick.

22. In a copy-multiplying device for duplicating on a clear sheet matter imprinted in reverse on a master sheet with copying ink having a master copy drum, in combination with opposed feed rollers for advancing a sheet to be printed, one of said rollers being journalled under tension, moisture supplying means including a wick, the face of one of said rollers engaging said wick and whereby said wick solely provides its engaging roller with a limited moisture.

23. In a copy-multiplying device for duplicating on a clear sheet matter imprinted in reverse on a master sheet with copying ink, means for moistening the sheets to be printed comprising a roller having a substantially non-absorbent surface, a moisture reservoir spaced therefrom and means including a wick for transferring moisture from said reservoir to said roller surface.

24. In a machine for duplicating on a copy sheet matter imprinted in reverse on a master sheet with copying ink, means adapted to guide the copy paper, a supply tank, means adapted to maintain a body of liquid in said tank at a constant level, a roller having a non-porous periphery and adapted to contact with the copy paper, a wick adapted to supply liquid from said tank to the periphery of said roller in the form of a thin surface film, and means adapted to apply the master letter or the like to the copy paper after it has been moistened.

25. In the art of duplicating on a copy sheet matter imprinted in reverse on a master sheet with copying ink, those steps which consist in supplying a thin film of liquid from a pool of said liquid to a solid and non-porous applicator by capillary action, and then transferring the film of liquid from said applicator to the copy paper, and causing the moistening copy paper to contact under pressure with the master document.

26. In a method of making duplicate copies of matter imprinted in reverse with copying ink on a master sheet, which method includes the use of a non-inflammable rapidly drying liquid solvent and the steps of moistening one side of a copy sheet by capillary action with a predetermined quantity of said liquid, bringing the master sheet and moistened face of the sheet into contact with one another under pressure and of adjusting the pressure to make either a light or heavy duplicate copy at will.

27. In a machine for duplicating onto sheets previously moistened with a rapidly volatilizing liquid ink dissolvent, a rotatable copy drum adapted to carry a master copy sheet with matter imprinted in reverse with a suitable dissolvable copying ink and a coacting pressure roller for said drum with means for rotating said drum and roller; a tank containing liquid, a moisture applicator mounted out of contact with the liquid in said tank, fibrous liquid up-lifting means engaging the liquid within said tank and said applicator whereby said fibrous means provides said applicator with a constant quantity of moisture uniformly distributed, coacting pressure means adapted to press a clear sheet into engagement with said applicator with means for positioning and feeding successive clear sheets in engaging relation with said applicator and pressure means and in registration with the imprinted face of the master sheet and to press the clear sheet against the master sheet to print thereon a duplicate of the matter imprinted on said master sheet.

28. In a machine for duplicating onto sheets previously moistened with a rapidly volatilizing liquid ink dissolvent, a rotatable copy drum adapted to carry a master copy sheet with matter imprinted in reverse with a suitable dissolvable copying ink and a coacting pressure roller for said drum with means for intermittently rotating said drum and roller; a tank containing liquid, a moisture applicator out of direct contact with the liquid in said tank, fibrous liquid up-lifting means engaging the liquid within said tank and said applicator together with means including said drum and roller for positioning and feeding successive clear sheets in engaging relation with said applicator and to register with said master copy and press the clear sheet against the master copy sheet to print thereon a duplicate of the matter imprinted on said master sheets, and means for forcing the under face of said clear sheet into close engagement with said applicator during the forward feeding movement of said clear sheet.

29. A machine for duplicating onto sheets previously moistened with a rapidly volatilizing liquid ink dissolvent, having a rotatable copy drum adapted to carry a master copy sheet with matter imprinted in reverse with a suitable dissolvable copying ink and a coacting pressure roller for said drum with means for rotating said drum and roller, in combination with opposed rotative feed rollers for advancing a clear sheet to be printed upon, a fibrous material engaging one of said rollers and from which the face of said roller receives moisture, together with means for supplying moisture to said fibrous material, cooperative driving means for rotating said copy drum and feed roller to advance said clear sheet for registering engagement by said drum and its coacting pressure roller for the purpose of duplicating said imprinted matter on said clear sheet.

30. A machine for duplicating onto sheets previously moistened with a rapidly volatilizing liquid ink dissolvent, having a rotatable copy drum adapted to carry a master copy sheet with matter imprinted in reverse with a suitable dissolvable copying ink and a coacting pressure roller for said drum with means for rotating said drum and roller, in combination with opposed rotative feed rollers for advancing a clear sheet to be printed upon, a fibrous material engaging one of said rollers and from which the face of said roller receives moisture, together with means for supplying moisture to said fibrous material.

31. A machine for duplicating onto sheets previously moistened with a rapidly volatilizing liquid ink dissolvent, having a rotatable copy drum adapted to carry a master copy sheet with matter imprinted in reverse with a suitable dissolvable copying ink and a coacting pressure roller for said drum with means for rotating said drum and roller, in combination with means for positioning and advancing said clear sheets to register for engagement with said drum and roller, said means embodying opposed feed rollers which are in engagement with one another and under pressure, the bight formed between said rollers being adapted, when said rollers are at rest, to position said clear sheets for advancement to register and engage with said master copy drum when said sheet is advanced by feeding movement of said rollers, together with means for moistening one face of said clear sheet as said sheet is advanced.

32. A copy-multiplying device for duplicating onto sheets previously moistened with a rapidly volatilizing liquid ink dissolvent, having a rotatable copy drum adapted to carry a master copy sheet with matter imprinted in reverse with a suitable dissolvable copying ink and a coacting pressure roller for said drum, in combination with opposed rotative feed rollers which engage one another under pressure and form a bight therebetween adapted to receive and position the end of an advanced sheet to be duplicated upon, moisture supplying means embodying a fibrous material engaging one of said rollers closely adjacent the bight thereof and whereby the face of said roller receives moisture, cooperative driving means for said copy drum and feed rollers and whereby said clear sheet is advanced.

33. A copy-multiplying device for duplicating onto sheets previously moistened with a rapidly volatilizing liquid ink dissolvent, having a rotatable copy drum adapted to carry a master copy sheet with matter imprinted in reverse with a suitable dissolvable copying ink and a coacting pressure roller for said drum, in combination with opposed rotative feed rollers which engage one another under pressure and form a bight therebetween adapted to receive and position the end of an advanced sheet to be duplicated upon.

34. A machine for duplicating onto sheets previously moistened with a rapidly volatilizing liquid ink dissolvent, having a rotatable copy drum adapted to carry a master copy sheet with matter imprinted in reverse with a suitable dissolvable copying ink and a coacting pressure roller for said drum, in combination with means for positioning, feeding and moistening a clear sheet to be duplicated upon to register and engage under pressure with said master copy sheet, said means comprising opposed feed rollers in engagement with one another under pressure, said rollers being disposed in front of the bight of said drum and coacting pressure roller, and a support, for a stack of clear sheets, disposed in front of said feed rollers and substantially in alignment with the bight thereof, and moisture supplying means including a fibrous material in engagement with one of said rollers and whereby a limited amount of moisture is applied to the face of said roller as said roller is rotated.

35. A machine for duplicating onto sheets previously moistened with a rapidly volatilizing liquid ink dissolvent, having a rotatable copy platen and adapted to carry a master copy sheet with matter imprinted in reverse with a suitable dissolvable copying ink and a coacting pressure roller for said platen, in combination with driving means for said platen, said driving means embodying means adapted to be continuously driven and intermittent gears coacting with said driven means for automatically effecting a dwell of said platen for a determined period and in a predetermined position after each cycle of operation of said platen and during continued movement of said driving connections, said dwell period being effected for the purpose of positioning the forward edge of a clear sheet to be duplicated upon for feeding in registering engagement with said master copy on the next subsequent cycle of rotation of said platen.

36. A machine for duplicating onto sheets previously moistened with a rapidly volatilizing liquid ink dissolvent, having a rotatable copy platen adapted to carry a master copy sheet with matter imprinted in reverse with a suitable dissolvable copying ink and a coacting pressure roller for said platen, in combination with driving means for said platen, said driving means embodying means adapted to be continually driven and intermittent gears coacting with said driven means for automatically effecting a dwell of said platen for a determined period and in a predetermined position after each cycle of operation of said platen and during continued movement of said driving connections, one of said coacting gears being adjustably secured in driving relation to said platen, said dwell period being effected for the purpose of positioning the forward edge of the clear sheet to be duplicated upon for feeding in registering engagement with said master copy on the next subsequent cycle of rotation of said platen.

37. A machine for duplicating onto sheets previously moistened with a rapidly volatilizing liquid ink dissolvent, having a rotatable copy platen adapted to carry a master copy sheet with matter imprinted in reverse with a suitable dissolvable copying ink and a coacting pressure roller for said platen and moisture applying means for moistening a clear sheet to be duplicated upon, in combination with driving means for said platen, said driving means embodying means adapted to be continually driven and intermittent gears coacting with said driven means for automatically effecting a dwell of said platen for a determined period and in a predetermined position after each cycle of operation of said platen and during continued movement of said driving connections, said dwell period being effected for the purpose of positioning the forward edge of the clear sheet to be duplicated upon for feeding in registering engagement with said master copy on the next subsequent cycle of rotation of said platen said moisture applying means being in engagement with said clear sheet during the advancing of same.

38. A machine for duplicating onto sheets previously moistened with a rapidly volatilizing liquid ink dissolvent, having a rotatable copy platen adapted to carry a master copy sheet with matter imprinted in reverse with a suitable dissolvable copying ink and a coacting pressure roller for said platen, in combination with opposed rotative feed rollers for advancing a clear sheet to be duplicated upon for registering engagement by said platen and its coacting roller, a fibrous material, one of said feed rollers engaging with said fibrous material and from which the face of said roller receives moisture, with means for supplying moisture to said fibrous material; driving means for said platen and rollers, said driving means embodying means adapted to be continually driven and intermittent gears coacting with said driven means for automatically effecting a dwell period of said platen and rollers in a predetermined relation and for a determined period after each complete cycle of operation of said platen, said dwell period being effected for the purpose of positioning the forward edge of a clear sheet to be duplicated upon for feeding and to register for engagement with said master copy on the next subsequent cycle of rotation of said platen.

39. A machine for duplicating onto sheets previously moistened with a rapidly volatilizing liquid ink dissolvent, having a rotatable copy platen adapted to carry a master copy sheet with matter imprinted in reverse with a suitable dissolvable copying ink and a coacting pressure roller for said platen, in combination with opposed rotative feed rollers for advancing a clear sheet to be duplicated upon for registering engagement with said platen and its coacting roller, a fibrous material, one of said feed rollers engaging with said fibrous material and from which the face of said roller receives moisture with means for supplying moisture to said fibrous material; driving means for said platen and roller, said driving means embodying means adapted to be continually driven and intermittent gears coacting with said driven means for automatically effecting a dwell period of said platen and rollers in a predetermined relation and for a determined period after each complete cycle of operation of said platen, one of said coacting gears being adjustable to positively position the dwell period of said platen in a direct relation to said feed rollers, said dwell period being effected for the purpose of positioning the forward edge of a clear sheet to be duplicated upon for feeding and to register for engagement with said master copy on the next subsequent cycle of rotation of said platen.

40. A copy-multiplying device for duplicating onto sheets previously moistened with a rapidly volatilizing liquid ink dissolvent, having a rotatable copy drum adapted to carry a master copy sheet with matter imprinted in reverse with a suitable dissolvable copying ink and a coacting pressure roller for said drum, in combination with opposed rotative feed rollers for advancing a sheet to be duplicated upon, moisture supplying means embodying a fibrous material in engagement with the face of one of said rollers and whereby said roller receives moisture solely from said fibrous material.

FREDERICK W. STORCK.

DISCLAIMER

Re. 19,951.—*Frederick W. Storck*, Arlington, Mass. APPARATUS FOR DUPLICATING IMPRINTED MATTER. Patent dated April 28, 1936. Disclaimer filed January 31, 1939, by the assignee, *Standard Mailing Machines Company*.

Hereby enters this disclaimer to claim 8 in said specification.

[*Official Gazette February 21, 1939.*]

a direct relation to said feed rollers, said dwell period being effected for the purpose of positioning the forward edge of a clear sheet to be duplicated upon for feeding and to register for engagement with said master copy on the next subsequent cycle of rotation of said platen.

40. A copy-multiplying device for duplicating onto sheets previously moistened with a rapidly volatilizing liquid ink dissolvent, having a rotatable copy drum adapted to carry a master copy sheet with matter imprinted in reverse with a suitable dissolvable copying ink and a coacting pressure roller for said drum, in combination with opposed rotative feed rollers for advancing a sheet to be duplicated upon, moisture supplying means embodying a fibrous material in engagement with the face of one of said rollers and whereby said roller receives moisture solely from said fibrous material.

FREDERICK W. STORCK.

DISCLAIMER

Re. 19,951.—*Frederick W. Storck*, Arlington, Mass. APPARATUS FOR DUPLICATING IMPRINTED MATTER. Patent dated April 28, 1936. Disclaimer filed January 31, 1939, by the assignee, *Standard Mailing Machines Company*.

Hereby enters this disclaimer to claim 8 in said specification.

[*Official Gazette February 21, 1939.*]